(12) United States Patent
Honda et al.

(10) Patent No.: US 6,550,847 B2
(45) Date of Patent: Apr. 22, 2003

(54) DEVICES AND METHODS FOR REINFORCING HOLLOW STRUCTURAL MEMBERS

(75) Inventors: Ken Honda, Toyota (JP); Nobuaki Matsuki, Nisshin (JP)

(73) Assignee: NEO-EX Lab, Inc., Toyota (JP)

( * ) Notice: Subject to any disclaimer, the term of this patent is extended or adjusted under 35 U.S.C. 154(b) by 0 days.

(21) Appl. No.: 09/840,934

(22) Filed: Apr. 25, 2001

(65) Prior Publication Data
US 2001/0042353 A1 Nov. 22, 2001

(30) Foreign Application Priority Data

Apr. 26, 2000 (JP) ........................................ 2000-126170
Mar. 7, 2001 (JP) ........................................ 2001-063890

(51) Int. Cl.[7] ............................... B06J 7/00; B06J 5/00; E04C 3/30
(52) U.S. Cl. ............................... 296/146.6; 296/203.03; 296/205; 52/735.1
(58) Field of Search ........................... 296/87, 203.03, 296/209, 205, 146.6; 52/735.1

(56) References Cited

U.S. PATENT DOCUMENTS

| 5,076,632 A | * | 12/1991 | Surratt |
| 5,102,188 A | * | 4/1992 | Yamane |
| 5,631,304 A |  | 5/1997 | Hasegawa |
| 5,642,914 A | * | 7/1997 | Takabatake |
| 5,806,915 A | * | 9/1998 | Takabatake |
| 6,003,274 A |  | 12/1999 | Wycech |
| 6,092,864 A | * | 7/2000 | Wycech et al. |
| 6,135,542 A | * | 10/2000 | Emmelmann et al. |
| 6,165,588 A | * | 12/2000 | Wycech |
| 6,199,940 B1 | * | 3/2001 | Hopton et al. |
| 6,253,524 B1 | * | 7/2001 | Hopton et al. |
| 6,305,136 B1 | * | 10/2001 | Hopton et al. |

FOREIGN PATENT DOCUMENTS

| FR | 2749263 | 12/1997 |
| JP | 8208871 | 8/1996 |
| JP | 1053156 | 2/1998 |
| JP | 11158313 | 6/1999 |
| WO | WO 9743501 | 11/1997 |

OTHER PUBLICATIONS

U.S. patent application Ser. No. 09/129,228.
U.S. patent application Ser. No. 09/322,779.

* cited by examiner

Primary Examiner—Carl D. Friedman
Assistant Examiner—Kevin McDermott
(74) Attorney, Agent, or Firm—Dennison, Schultz & Dougherty

(57) ABSTRACT

A reinforcement device may include at least one elongated reinforcement body having a longitudinal axis and at least one foamable member that produces a foamed product when heated. The foamable member is preferably disposed along the longitudinal axis of the reinforcement body so that the foamed product will extend along the longitudinal axis of the reinforcement body. Preferably, the foamed product bonds the reinforcement body to a hollow structural member in order to reinforce the hollow structural member.

23 Claims, 8 Drawing Sheets

DEVICES AND METHODS FOR REINFORCING HOLLOW STRUCTURAL MEMBERS

BACKGROUND OF THE INVENTION

1. Field of the Invention

The present invention relates to devices and structures for reinforcing a hollow structural member. More particularly, the present invention relates to devices and structures for reinforcing a closed box-like hollow structural member constructed from two or more plates, such as a front pillar, a center pillar, a quarter pillar, a roof side panel or a rocker panel of a vehicle. Preferably, the reinforcing device increases the strength and rigidity of the hollow structural member.

2. Description of the Related Art

In order to reinforce a hollow structural member (for example, a front pillar of a vehicle), a reinforcement device may be disposed within a cavity of the hollow structural member. Such a reinforcement device may be an elongated member that is arranged in the cavity in such a way as to extend along a longitudinal direction of the hollow structural member.

A known reinforcement device is taught by Japanese Laid-open Patent Publication Number 10-53156. This reinforcement device comprises a reinforcement member and a plurality of foamable members that are disposed laterally, or perpendicularly, to the longitudinal axis of the reinforcement member. The reinforcement member is attached to the inner surface of the hollow structural member at both ends of the reinforcement member.

The known reinforcement device is particularly useful to reinforce a hollow structural member, because the reinforcement device can be mounted within the hollow structural member before painting. Because the reinforcement device is connected to the hollow structural member by only two attachments, substantially the entire interior of the hollow structural member can be coated with paint before the entire structure is baked to activate the foamable material. Thus, the known reinforcement device provides a convenient device for reinforcing and closing a hollow structural member and substantially the entire interior surface of the hollow structural member can be protected from corrosion.

SUMMARY OF THE INVENTION

It is, accordingly, an object of the present teachings to provide further improved reinforcement devices and structures.

Several devices and structure are provided by the present teachings. For example, reinforcement devices are taught that can be inserted into a cavity of a hollow structural member in order to reinforce the hollow structural member. In one embodiment of the present teachings, reinforcing devices may include an elongated reinforcement member and a foamable member that can produce a foamed product when heated. Preferably, the foamable member is attached to the reinforcement member in such a way that the foamable member extends along the longitudinal direction of the reinforcement member. Therefore, after activation (i.e. foaming) of the foamable member, the reinforcement member will be attached or bonded to the inner surface of the hollow structural member and the foamed product will extend along the longitudinal direction of the hollow structural member.

In another embodiment of the present teachings, the reinforcing device is disposed within a cavity of a hollow structural member in such a way as to extend along the longitudinal axis of the hollow structural member. The foamable member is preferably disposed within a recess defined along the longitudinal axis of the elongated reinforcement member. Thus, the resulting foamed product will be longitudinally disposed between the recess of the reinforcement member and the inner surface of the hollow structural member, so as to interconnect the reinforcement device and the hollow structural member.

In another embodiment of the present teachings, the foamed product continuously extends along the longitudinal axis of the reinforcement member. As a result, the hollow structural member can be reliably reinforced and may provide rigidity to torsional stresses.

The present teachings will become more fully apparent from the following description and the claims as it proceeds in connection with the drawings.

DETAILED DESCRIPTION OF THE PREFERRED EMBODIMENTS

Preferred embodiments of the invention will now be described in detail with reference to the drawings.

Figure 1:
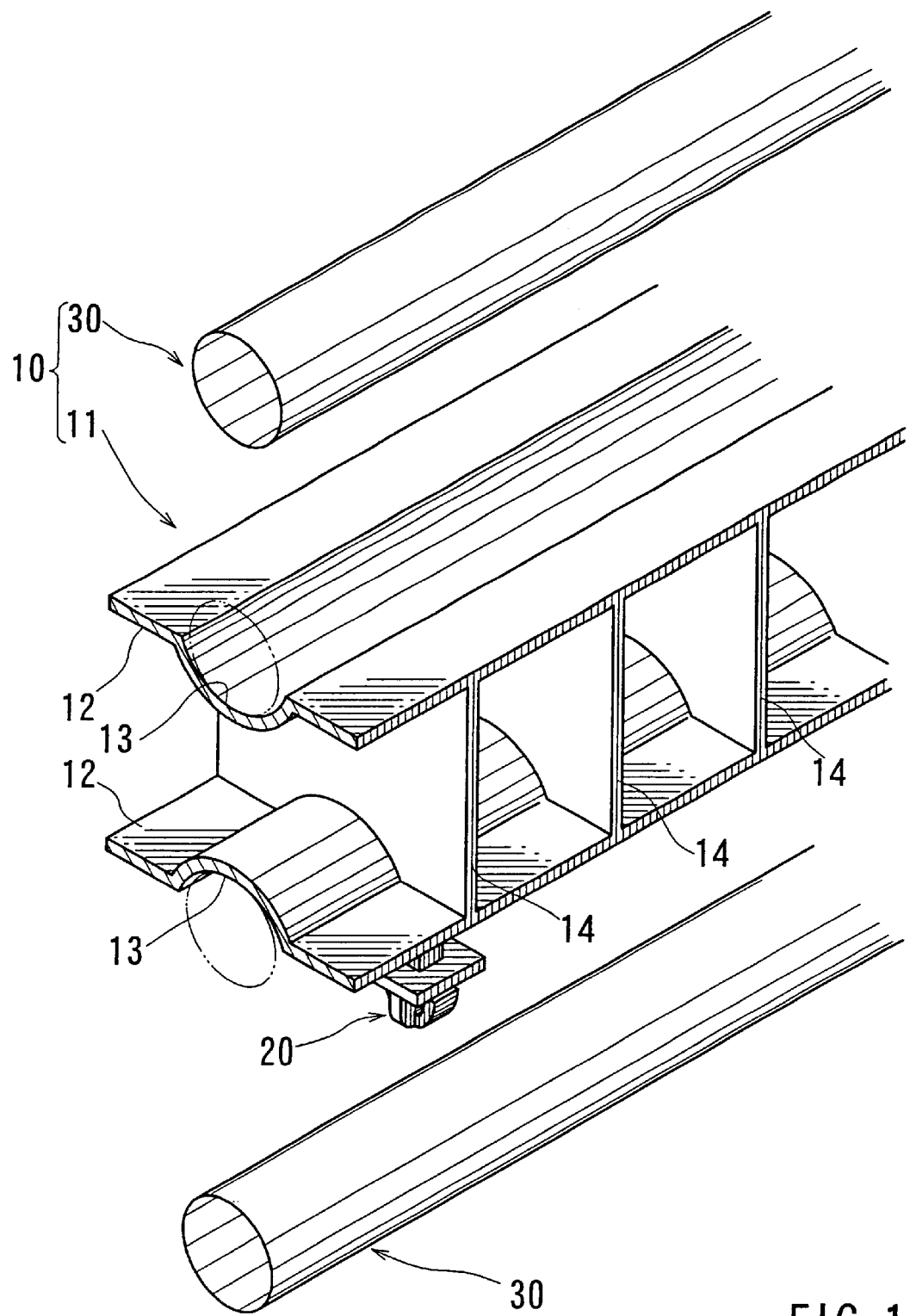
FIG. 1 is an exploded perspective view of a reinforcement device for reinforcing a hollow structural member according to a first representative embodiment of the present teachings.
Figure 2:
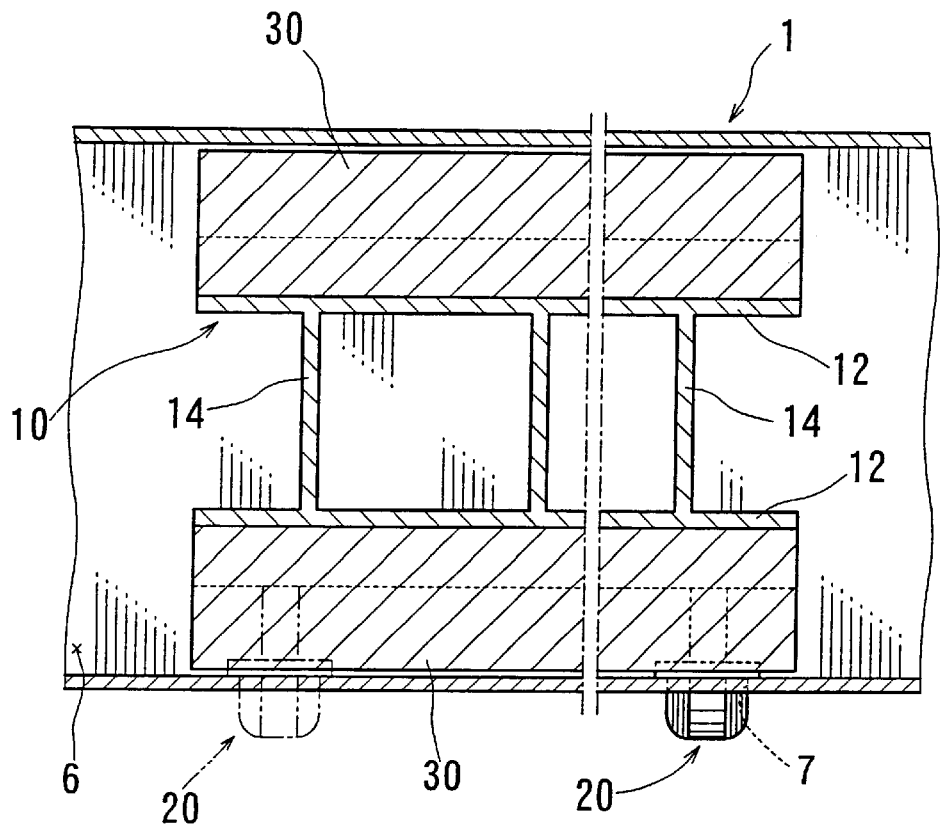
FIG. 2 is a longitudinal sectional view of the reinforcement device of FIG. 1 before the foamable members are foamed and expanded.
Figure 3:
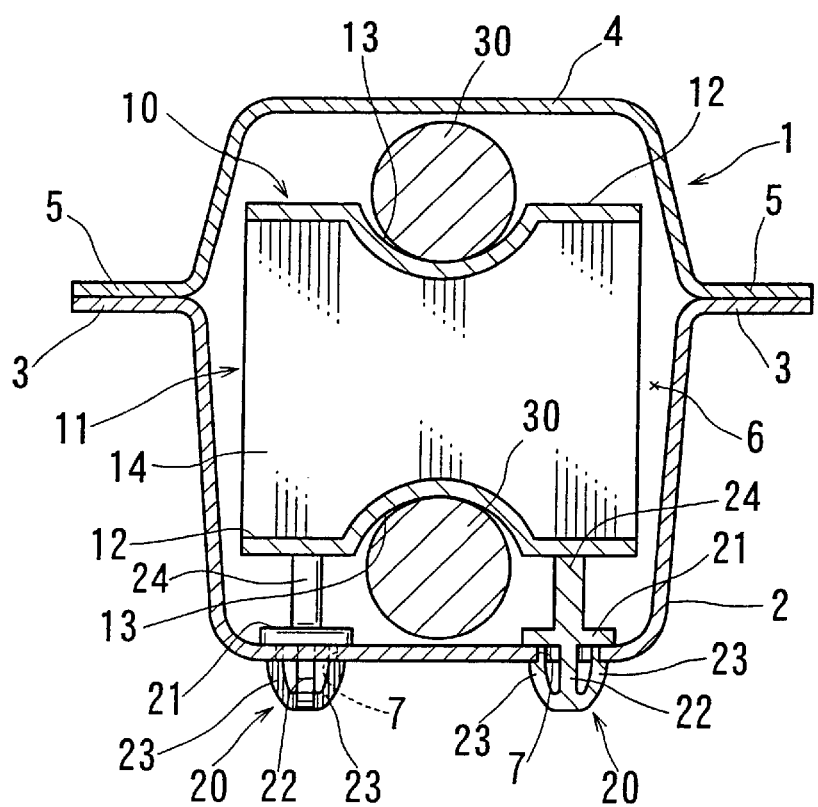
FIG. 3 is a transverse sectional view of the reinforcement device of FIG. 1 before the foamable members are foamed and expanded.

A first detailed representative embodiment is shown in FIGS. 1 to 5. As shown in FIGS. 2 and 3, a pillar 1 of a vehicle body is exemplified as a hollow structural member. For example, the pillar 1 may be a center pillar or a front pillar of a vehicle body, although naturally a variety of hollow structural members are contemplated by the present teachings. As best shown in FIG. 3, the pillar 1 is constructed from an elongated inner pillar panel 2, which has flanges 3 extending along the edges of the panel 2, and an elongated outer pillar panel 4, which has flanges 5 extending along the edges of the panel 4. The inner pillar panel 2 and outer pillar panel 4 preferably are spot welded along flanges 3 and 5. Thus, the pillar 1 has an elongated closed box-like hollow shape and a longitudinally extending cavity 6 is defined within pillar 1. Optionally, the inner pillar panel 2 may have one or more attachment holes 7 that are preferably arranged in order to attach the reinforcement device 10 to the pillar 1, as will be discussed further below.

The elongated reinforcement device 10 is disposed within cavity 6 and extends along the longitudinal direction of the pillar 1. As best shown in FIG. 1, the reinforcement device 10 comprises an elongated reinforcement body 11 that extends along the longitudinal direction of the pillar cavity 6 and a pair of foamable members 30 that have substantially the same length as the reinforcement body 11. The foamable members 30 may be cylindrical, although a variety of other shapes may be utilized. Further, the foamable members 30 preferably extend along the longitudinal axis of the elongated reinforcement body 11. While the foamable member 30 continuously extend along the longitudinal axis of the elongated reinforcement body 11 in the first representative embodiment, naturally, each foamable member 30 may comprise a plurality of pieces that are disposed along the longitudinal axis of the elongated reinforcement body 11.

The elongated reinforcement body 11 preferably is integrally formed from one or more heat-resistive synthetic resinous materials, although other materials may be utilized. Further, the elongated reinforcement body 11 is preferably rigid so as to provide reinforcement to the pillar 1. Various techniques may be utilized to form elongated reinforcement body 11, such as injection molding, extrusion molding, blow molding or other such processes. Preferably, elongated reinforcement body 11 has a shape that substantially corresponds to the shape of the cavity 6. In this representative embodiment, elongated reinforcement body 11 comprises a pair of elongated main walls 12 and the elongated main walls 12 are preferably disposed in a parallel relationship. A plurality of cross walls 14 are preferably disposed between the main walls 12 and connect the main walls 12 to each other. For example, as described in the first representative embodiment, the main walls 12 may be disposed laterally, or perpendicular, to the longitudinal axis of the main walls 12. As best shown in FIG. 3, the walls 12, 14 are designed so that a space or clearance is defined between the main walls 12 and the surface of cavity 6 when the reinforcement device 10 is positioned within the cavity 6. These spaces permit a coating material, such as paint, to substantially coat the entire surface of cavity 6 before the foamable members 30 are activated (i.e. foamed). Optionally, the main walls 12 may include grooves or retainer recesses 13 that extend along the longitudinal length of the main walls 12. These retainer recesses 13 may, for example, have an arcuate cross section that faces the pillar panel surfaces.

Optionally, a plurality of one-piece clips 20 may be disposed on one of the main walls 12. For example, the clips 20 may be disposed along the main wall 12 that is adjacent to the inner pillar panel 2 when the reinforcement device 10 is introduced into the cavity 6. The clips 20 may be appropriately arranged so as to align with and engage the attachment holes 7 of the inner pillar panel 2. The clips 20 may serve as means for securing the reinforcement body 11 within the cavity 6, although naturally other attachment means may be utilized together with the present teachings. As best shown in FIG. 3, each of the clips 20 preferably comprises a shank 24 that extends from the main wall 12 and terminates at a stopper plate 21. A leg 22 preferably extends from the stopper plate 21. One or more retaining pieces 23 preferably extend from the free or terminal end of the leg 22 at an angle to the central axis of leg 22. Thus, the retaining pieces 23 preferably are folded or bent back toward the stopper plate 21. The retaining pieces 23 are preferably adapted to elastically engage the periphery of the attachment holes 7 when the clips 20 are inserted into the attachment holes 7. Further, the stopper plate 21 effectively prevents the clip 20 from being excessively inserted into cavity 6, so that the reinforcement body 11 can be accurately positioned within the cavity 6.

The foamable members 30 are received in the retainer recesses 13 of the reinforcement body 11 and may be bonded thereto by self-adhesion, or by adhesives or other such means, to thereby produce the reinforcement device 10. Further, the foamable members 30 and the reinforcement body 11 can be provided with engagement means, e.g., projections and corresponding holes (not shown in FIGS. 1–5), in order to accurately and reliably bond the foamable member 30 and the reinforcement body 11. Representative engagement means that may be utilized with the first representative embodiment are described in further detail below with respect to FIGS. 11–15. Thus, the foamable members 30 preferably serve as means for bonding the reinforcement body 11 to the pillar panels 2, 4. That is, the foamable members 30 preferably expand to produce the foamed products 35 when heated, so as to secure the reinforcement body 11 within the panel cavity 6. Generally speaking, the foamable members 30 may be continuously formed, such as for example by extrusion molding, and then cut to the required length. However, each foamable member 30 may comprise a plurality of pieces of foamable material that are disposed along the longitudinal axis of the elongated reinforcement body 11.

The foamable members 30 preferably comprise foamable resinous materials that can foam and expand to produce rigid foamed products 35 when heated to an appropriate foaming temperature, e.g. 110° C.–190° C. For example, after the reinforcement device 10 is disposed within the pillar 1, the vehicle body may be externally heated to the foaming temperature in order to activate or foam the foamable members 30. This external heating may also have the effect of baking coating materials (e.g. paint) onto the pillar 1. The foamable members 30 preferably exhibit good adhesion to metals and synthetic resins when foamed and expanded. Further, the foamable members 30 preferably contain fibrous materials, such as glass fiber, and additional foaming agents for reinforcing purposes. Representative foamable materials are described, for example, in U.S. Pat. Nos. 5,631,304 and 6,403,668, both of which are hereby incorporated by reference as if fully set forth herein. In addition, further discussion is provided below concerning representative foamable materials that may be utilized with the present teachings.

Representative methods for reinforcing the pillar 1 using the reinforcement device 10 will now be described.

In a first or preparation step, the foamable members 30 are disposed in and attached to the retainer recesses 13 of the main walls 12 of the reinforcement body 11, to thereby produce the reinforcement device 10.

In a second or mounting step, as shown in FIGS. 2 and 3, the assembled reinforcement device 10 is longitudinally positioned within the inner panel 2 of the pillar 1, so as to engage the clips 20 of the body 11 with the attachment holes 7 of the inner panel 2. Thereafter, the inner panel 2 and the outer panels 4 are welded along flanges 3 and 5 in order to thereby form the pillar 1. Thus, the reinforcement device 10 is appropriately arranged in the cavity 6 of the pillar 1.

Figure 4:
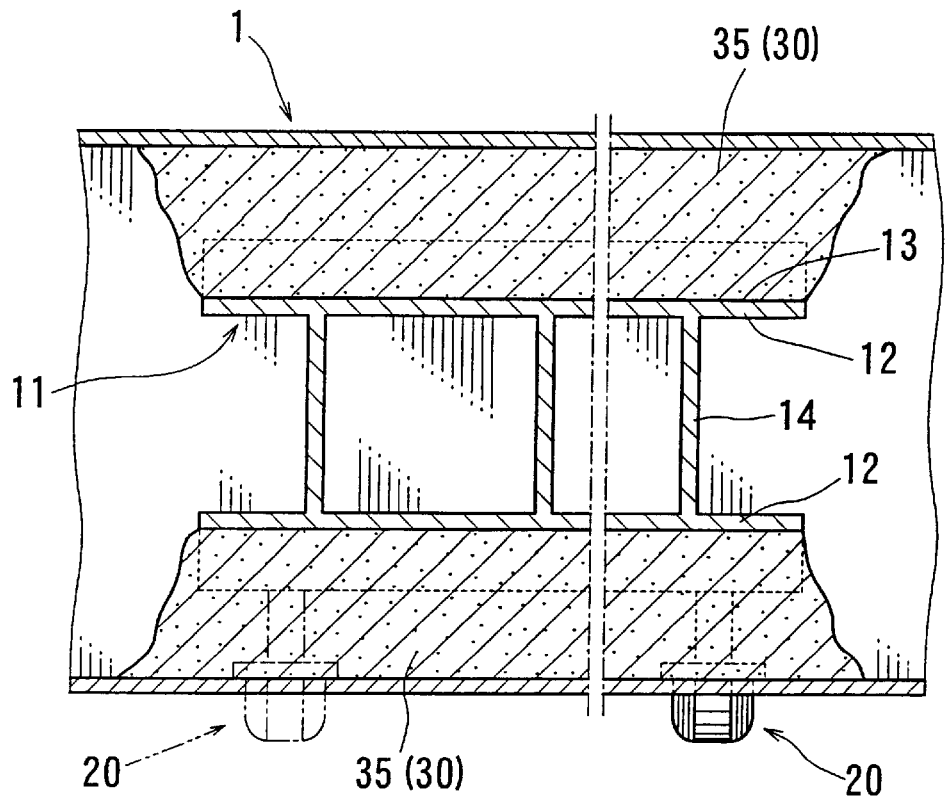
FIG. 4 is a longitudinal sectional view of the reinforcement device of FIG. 1 after the foamable members have been foamed and expanded.
Figure 5:
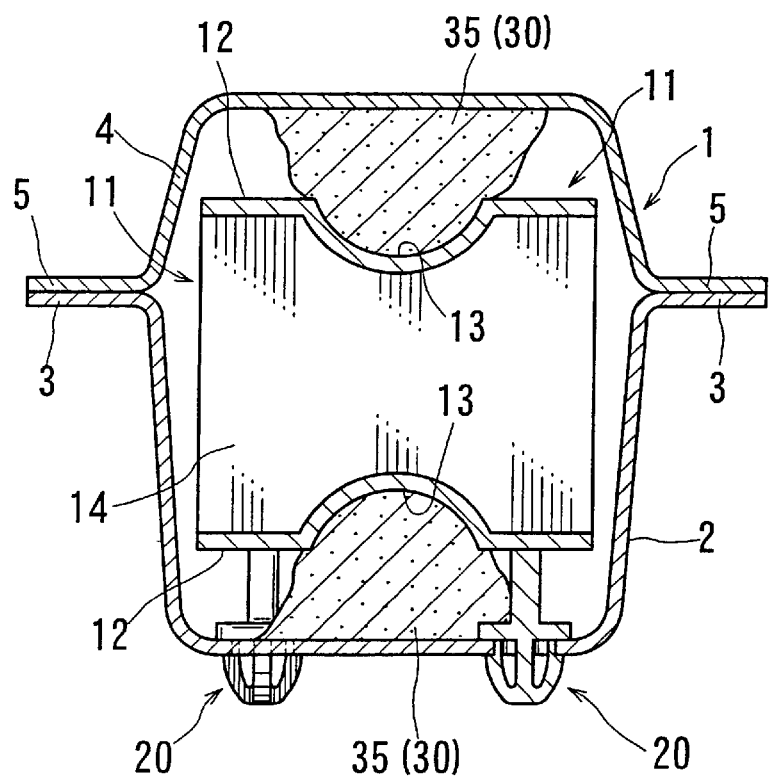
FIG. 5 is a transverse sectional view of the reinforcement device of FIG. 1 after the foamable members have been foamed and expanded.

Subsequently, in a third or heating step, the vehicle body having the pillar 1 is externally heated to bake any coating materials disposed on the pillar 1. In addition, the foamable members 30 will be heated, so as to expand and thermoset. Thus, the longitudinally extending foamed products 35 will be produced between the reinforcement body main walls 12 and the corresponding pillar panels 2, 4, as shown in FIGS. 4 and 5. Preferably, the longitudinally extending foamed products 35 extend along the entire length of the reinforcement body 11. Further, the foamed products 35 are reliably bound to the main wall surfaces and the panel surfaces without producing a clearance between the main wall surfaces and the pillar surfaces. Thus, the reinforcement body 11 will be rigidly fixed within the pillar cavity 6, thereby imparting rigidity and strength to the pillar 1.

According to the reinforcement device 10 of the first representative embodiment, the pillar 1 can be reliably strengthened to prevent deformation of the pillar 1 if an external force is applied to the pillar 1. In addition, the foamed products 35 can be bonded to the main walls 12 and the pillar panels 2, 4 without leaving any clearances. This feature may also contribute to an improvement in pillar rigidity, and in particular, torsional rigidity.

Further, because the foamable members 30 are received in and attached to the retainer recesses 13 of the reinforcement body 11, the foamable members 30 can be effectively prevented from unexpectedly separating from the reinforcement body 11 before the reinforcement device 10 is disposed within pillar 1. Thus, the reinforcement device 10 may be easily manufactured and shipped separately from the pillar 1 and also can be easily attached to the pillar 1.

A second detailed representative embodiment of the present teachings is shown in FIGS. 6 to 15 and the second detailed representative embodiment is related to the first detailed representative embodiment. Therefore, it is only necessary to describe constructions of the second detailed representative embodiment that are different from constructions described in the first detailed representative embodiment.

Figure 6:
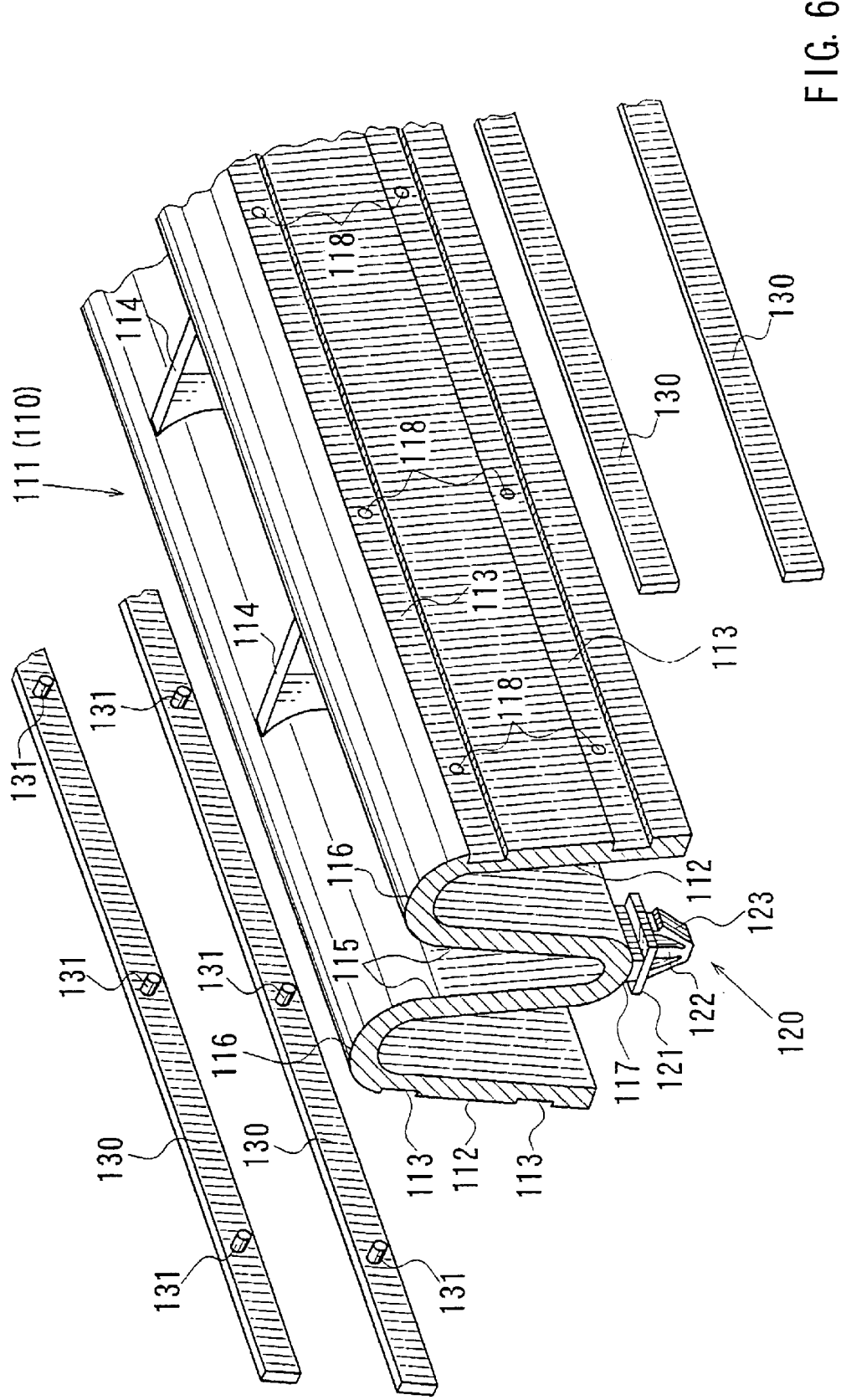
FIG. 6 is an exploded perspective view of a reinforcement device for reinforcing a hollow structural member according to a second representative embodiment of the present teachings.

As best shown in FIG. 6, a reinforcement device 110 comprises an elongated reinforcement body 111 that extends along the longitudinal direction of a pillar cavity 6. Two pairs of strip-like foamable members 130, which preferably have substantially the same length as the reinforcement body 111, are disposed along the longitudinal axis of the elongated reinforcement body 111.

The elongated reinforcement body 111 may preferably comprise the same heat resistive hard synthetic resinous materials as the first representative embodiment and may substantially have an M-shape in cross section. That is, the elongated reinforcement body 111 preferably comprises a pair of inner walls 115 that are oppositely arranged in a spaced relationship and are interconnected by a rounded inner connecting wall 117. A pair of outer walls 112 also may be provided that are connected to the inner walls 115 by rounded outer connecting walls 116. The reinforcement body 111 also may include a plurality of cross walls 114 that are laterally disposed along a central longitudinal groove defined between the inner walls 115. A plurality of cross walls 114 also may be disposed along the pair of side longitudinal grooves that are defined between the inner and outer walls 112, 115. The walls 114 are preferably connected to the walls 112, 115 in a spaced relationship.

As best shown in FIG. 6, each of the outer walls 112 of the reinforcement body 111 may include a pair of parallel retainer recesses 113 that extend along the length of the reinforcement body 111. These retainer recesses 113 preferably open outwardly and have a rectangular cross section, although naturally other shapes may be utilized. In addition, each of the outer walls 112 has a plurality of through holes 118 that may serve as engagement means. For example, holes 118 may be disposed along the retainer recesses 113 in a spaced relationship.

Figure 7:
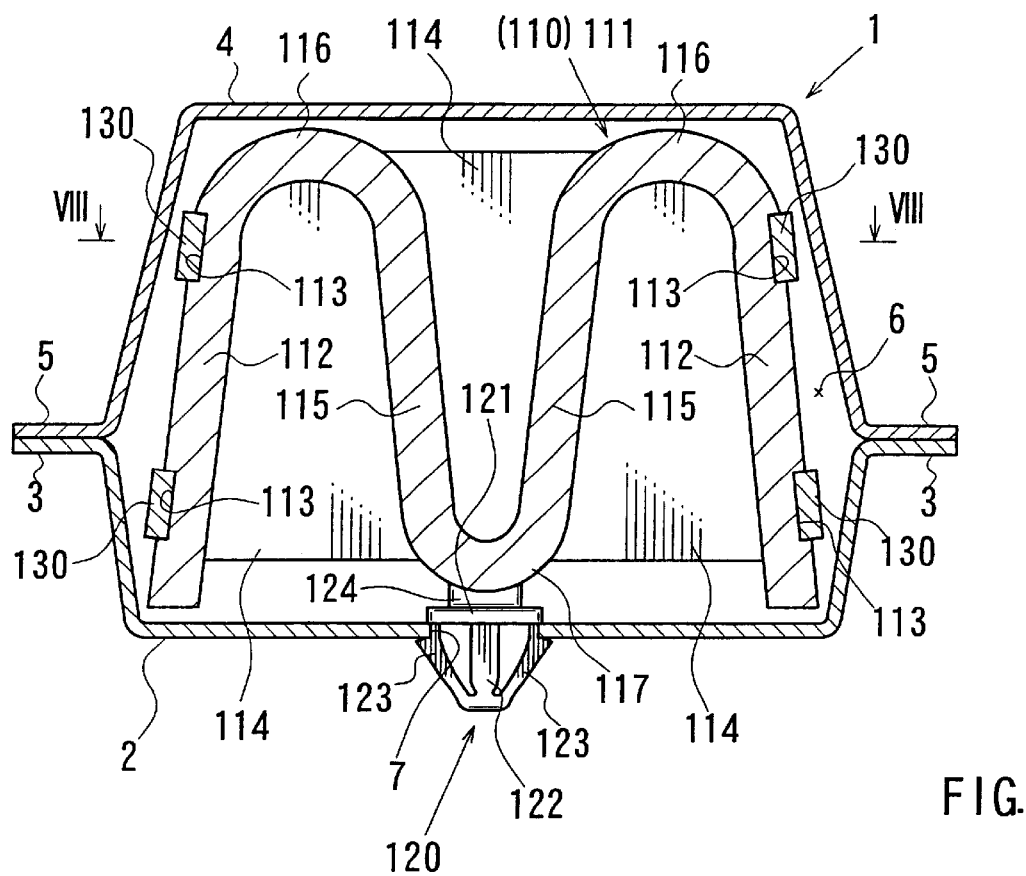
FIG. 7 is a transverse sectional view of the reinforcement device of FIG. 6 before the foamable members are foamed and expanded.

As shown in FIGS. 6 and 7, a plurality of one-piece clips 120 may be integrally provided along the inner connecting walls 117 and the clips 120 may be similar to the clips 20 of the first representative embodiment. Thus, each of the clips 120 may comprise a shank 124 that extends from the inner connecting wall 117 and terminates a stopper plate 121. A leg 122 may extend from the stopper plate 121. Further, a pair of retaining pieces 123 may extend from the free or terminal end of the leg 122 in a folded fashion toward the stopper plate 121. As a result, the clips 120 may function similarly to the clips 20 of the first representative embodiment.

The foamable members 130 preferably have a shape that is substantially complementary to the retainer recesses 113 of the reinforcement body 111. Further, the foamable members 130 may be disposed within the retainer recesses 113 in order to form the reinforcement device 110. The foamable members 130 may serve as means for bonding the reinforcement body 111 to pillar panels 2, 4. That is, the foamable members 130 preferably expand to produce the foamed products 135 when heated, so as to secure the reinforcement body 111 within the panel cavity 6. Like the first embodiment, the foamable members 130 can be continuously formed by extrusion molding, although each foamable member 130 may comprise a plurality of pieces of foamable material. In addition, the foamable members 130 preferably comprise the same foamable resinous materials as the first representative embodiment.

Figure 11:
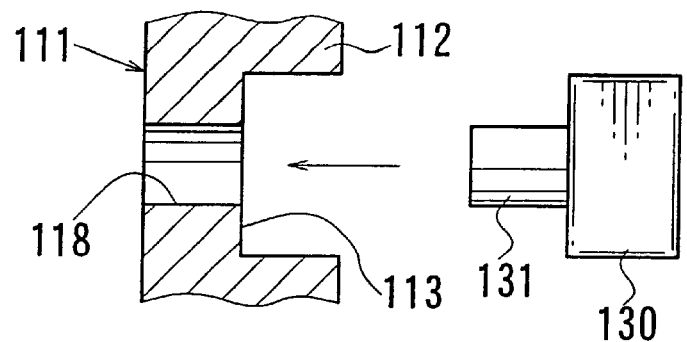
FIG. 11 is an enlarged fragmentary sectional view of a reinforcement member, before the foamable member is attached.

Optionally, each of the foamable members 130 may include a plurality of projections 131 that can serve as engagement means, as shown in more detail in FIG. 11. The projections 131 are preferably longitudinally disposed along the foamable members 130 in a spaced relationship so as to align with and engage the through holes 118 when the foamable members 130 are inserted into the retainer recesses 113. That is, in this embodiment, the projections 131 engage the through holes 118, so that the foamable members 130 are accurately positioned in the retainer recesses 113 of the reinforcement body 111.

Representative methods for reinforcing the pillar 1 using the reinforcement device 110 will now be described.

In a first or preparation step, the foamable members 130 are disposed in the retainer recesses 113 of the reinforcement body 111 so that the projections 131 of the foamable members 130 engage the through holes 118 provided in the recesses 113. Thus, reinforcement device 110 preferably comprises the reinforcement body 111 and the foamable members 130.

Figure 8:
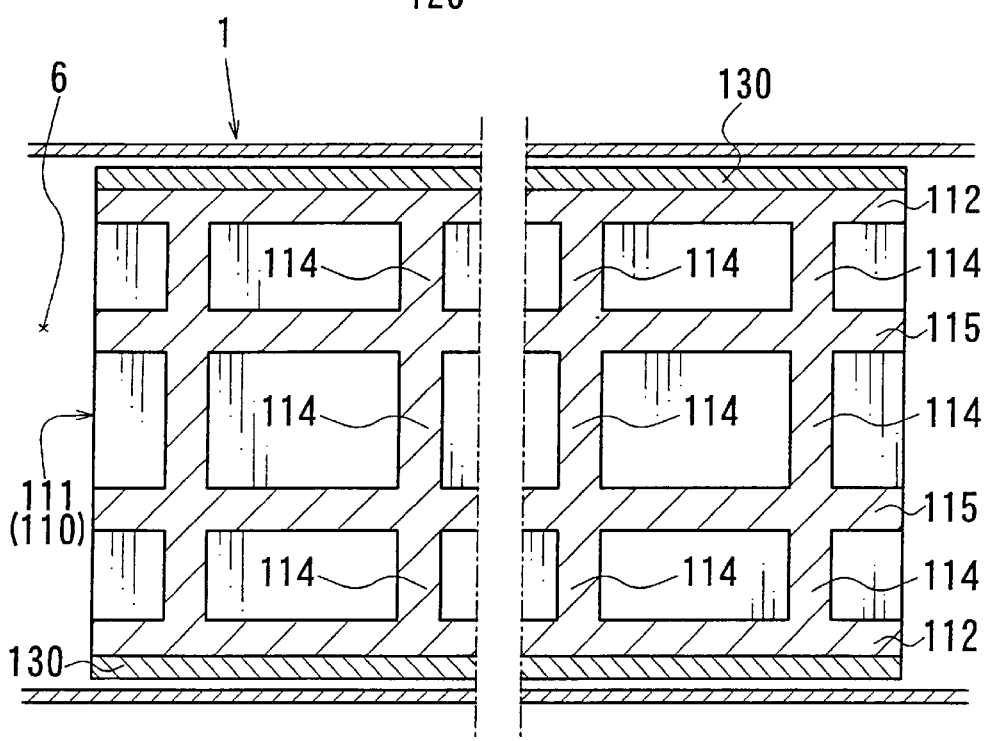
FIG. 8 is a sectional view of taken along the line VIII—VIII of FIG. 8.

In a second or mounting step, as shown in FIGS. 7 and 8, the reinforcement device 110 is longitudinally positioned on the inner panel 2 of the pillar 1 so as to engage the clips 120 of the body 111 with the attachment holes 7 of the inner panel 2. Thereafter, the inner panel 2 and the outer panel 4 are welded along flanges 3 and 5 to thereby form the pillar 1. As a result, the reinforcement device 110 is appropriately arranged within the cavity 6 of the pillar 1.

Figure 9:
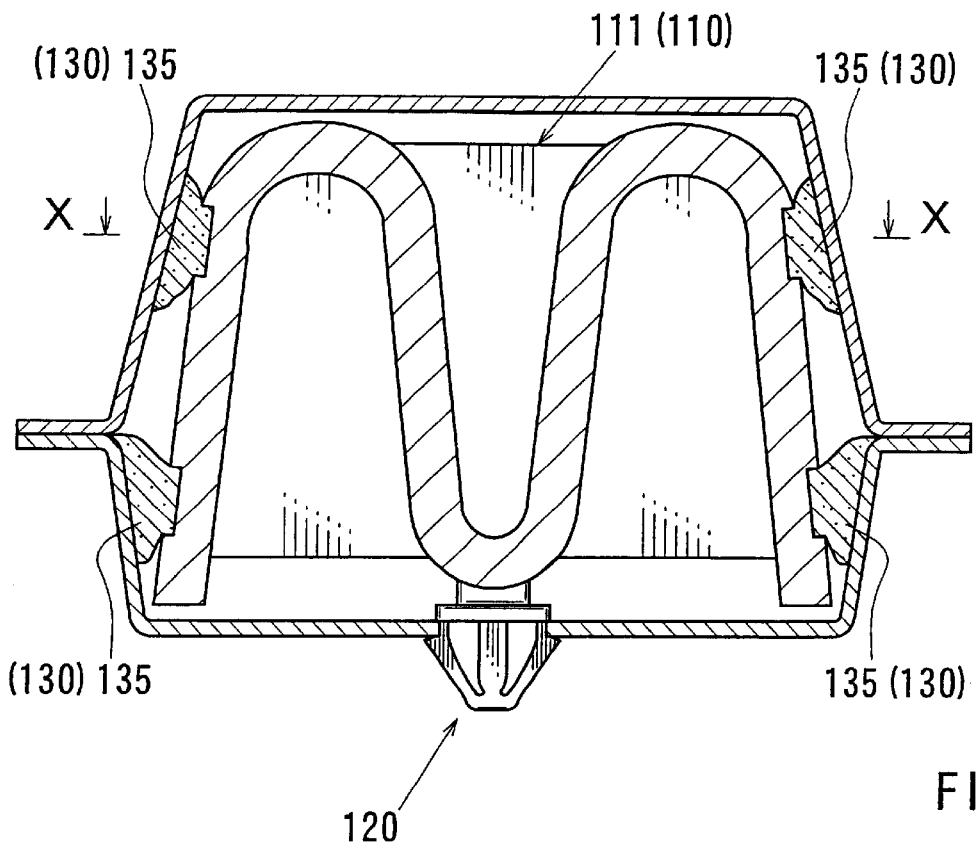
FIG. 9 is a transverse sectional view of the reinforcement device of FIG. 6 after the foamable members have been foamed and expanded.
Figure 10:
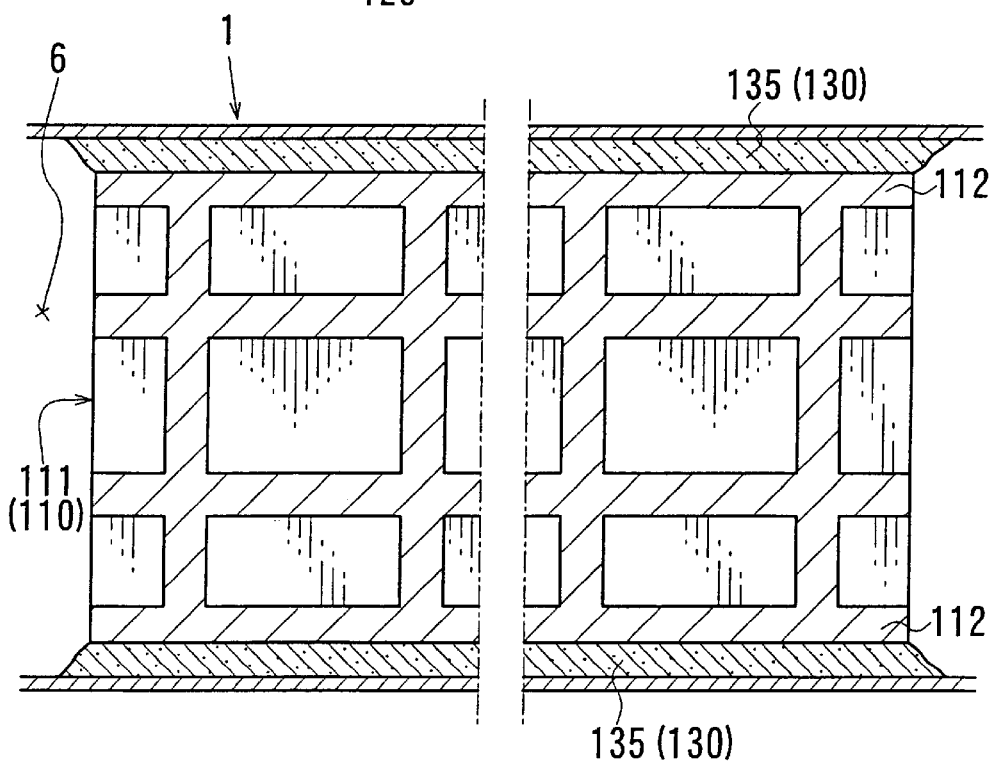
FIG. 10 is a sectional view of taken along the line X—X of FIG. 9.

Subsequently, in a third or heating step, the vehicle body having the pillar 1 is heated in the same manner as the first representative embodiment, thereby effectively heating the reinforcement device 110 within the cavity 6. Thus, the foamable members 130 are heated so as to expand and thermoset. As a result, the longitudinally extending foamed products 135 are formed between the reinforcement body outer walls 112 and the corresponding pillar panels 2, 4, as shown in FIGS. 9 and 10. Preferably, the foamed products 135 extend along the length of the reinforcement body 111. The foamed products 135 are thus reliably bound to both of the reinforcement body outer wall surfaces and the pillar panel surfaces. Thus, the reinforcement body 111 is rigidly fixed within the pillar cavity 6, so as to impart rigidity and strength to the pillar 1.

The reinforcement device 110 according to this embodiment may provide substantially the same effects and functions as the first representative embodiment.

Figure 12:
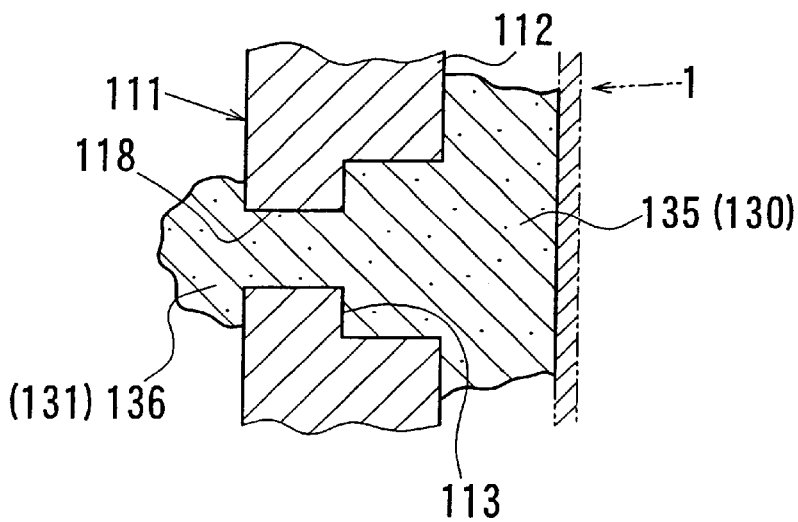
FIG. 12 is an enlarged fragmentary sectional view of the reinforcement member, after the foamable member has been foamed and expanded.

In addition, as shown in FIG. 12, the projections 131 can simultaneously foam and expand to produce foamed products 136 at the same time that the foamable members 130 expand to produce the foamed products 135. These foamed products 136 can partly protrude into the inner surfaces of the outer walls 112, to thereby cover the edges of the through holes 118. The protruding portions of these foamed products 136 may increase the bonding strength of the foamed products 135 to the reinforcement body 111. As a result, the reinforcement body 111 can be more securely fixed within the pillar cavity 6.

Figure 13:
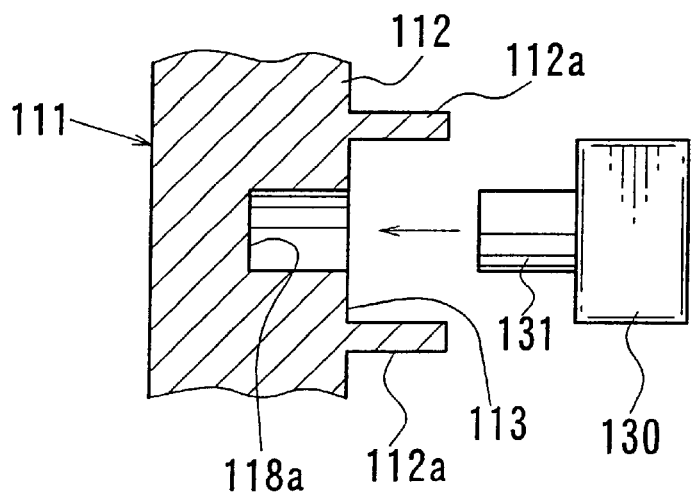
FIG. 13 is an enlarged fragmentary sectional view of a modification of the reinforcement member.

Although the outer walls 112 of the reinforcement body 111 may have grooves that form the retainer recesses 113, the outer walls 112 also may include rim or wall members 112a and the retainer recesses 113 are defined between rim members 112a, as shown in FIG. 13. In addition, the through holes 118 can be replaced with blind or closed holes 118a, if necessary.

Figure 14:
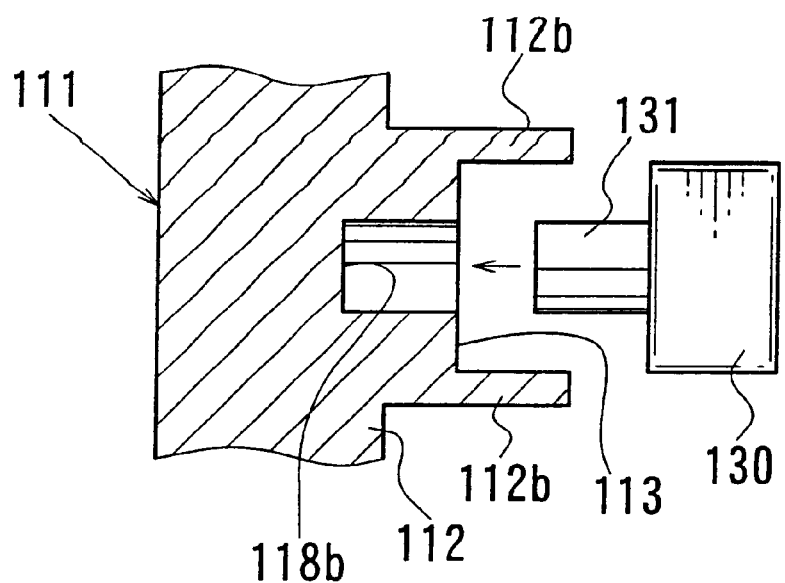
FIG. 14 is an enlarged fragmentary sectional view of another modification of the reinforcement member.

As shown in FIG. 14, the outer walls 112 also may include shouldered rim members 112b and the retainer recesses 113 may be defined between rim members 112b. Thus, the recesses 113 may be raised from the outer wall surface. In this modification as well, the through holes 118 can be replaced with blind or closed holes 118b.

Figure 15:
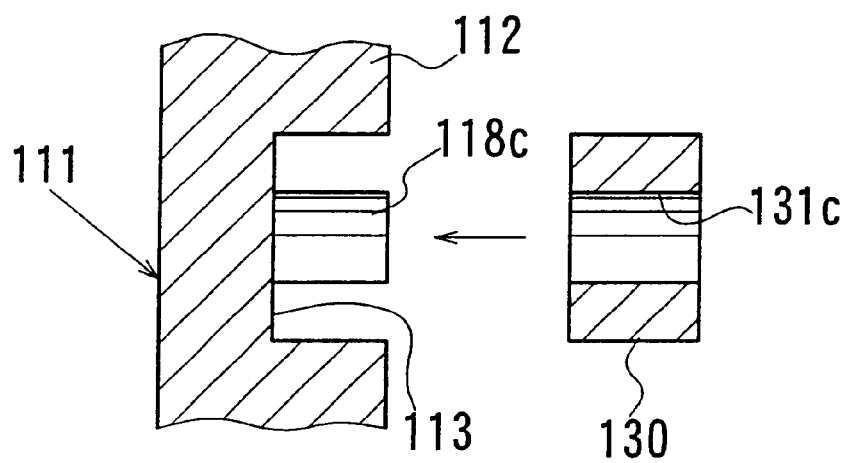
FIG. 15 is an enlarged fragmentary sectional view of a further modification of the reinforcement member.

FIG. 15 shows another modification of the present teachings, in which a plurality of projections 118c can be disposed within the retainer recesses 113 and corresponding holes 131c can be provided within the foamable members 130. Each of the engagement means shown in FIGS. 11–15 may be used independently or in combination with the embodiments of the present teachings.

Moreover, clips (not shown) may be utilized instead the projections 131 of the foamable members 130 in order to reliably attach the foamable members 130 to the reinforcement body 111. Also, the foamable members 130 can be simply attached to the reinforcement body 111 by an adhesive. In this case, it is not necessary to utilize any structural engagement means, such as for example holes and corresponding projections.

Further, although projections 131 are provided on the foamable members 130 of the second representative embodiment, the projections 131 can be omitted, if desired. In addition, the number and position of the recesses 113 and the foamable members 130 can be appropriately changed, as desired.

The constructions of the first and second representative embodiments can be further modified as discussed herein. For example, the recesses 13, 113 can be a curved or zigzag form and are not required to have a rectilinear form. The foamable members 30, 130 can be discontinuously formed. That is, the foamable members 30, 130 can comprise pellet-like members or chip-like members that are attached to the reinforcement body walls 12, 112 in an appropriate manner. The recesses 13, 113 can be omitted, if desired. Further, the clips 20, 120 can be replaced with apertured strips that can be secured to the pillar panel 2, for example using screws.

Further, the pillar of a vehicle body has been described as a representative hollow structural member. However, the hollow structural member is not limited to such pillars and may be a rocker panel, a roof side panel or other panels of a vehicle body. Moreover, the hollow structural member is not limited to parts of a vehicle body, as the present teachings are equally applicable to the reinforcement of any hollow structural members, such as for example structural components for buildings and ships.

In one preferred aspect of the present teachings, the foamable members 30, 130 preferably comprise an epoxy resin having an epoxy equivalents value of 300–4000, a curing agent and a foaming agent. The "epoxy equivalents value" is defined herein as the epoxy resin molecular weight (g/mole) per epoxy group. For example, an epoxy resin molecule having a molecular weight of 1000 g/mole and having 2 epoxy groups in the molecule has an "epoxy equivalents" value of 500. The foamable members 30, 130 also may include at least one type of thermoplastic resin selected from vinyl acetate and ethylene copolymer, ethylene and alkyl acrylate copolymer and/or polyethylene resin. Further, the foam precursor material also may contain a reinforcing material such as glass, metal and/or ceramic.

Preferably, the foam precursor material can be prepared by (1) heating and melting the epoxy resin, (2) adding the curing agent, foaming agent and any other desired additives to the molten epoxy resin, and (3) kneading the mixture. The curing and foaming agents are preferably handled at a temperature below the respective curing and foaming temperatures.

Epoxy resins having suitable epoxy equivalents are not restricted to a single type of epoxy resin. Rather, combinations of epoxy resins also may be used. Representative epoxy resins include, but are not limited to, glycidyl ether, glycidyl ester, glycidyl amine and alicyclic. Other types of epoxy resins may be used. In particular, bisphenol A, bisphenol F, brominated bisphenol A, hydrogenated bisphenol A, bisphenol S, bisphenol AF, biphenyl, naphthalene, fluorene, phenol novolac, ortho-cresone novolac, DPP novolac, trifunctional, tris-hydroxyphenylmethane, tetraphenolethane and other glycidyl ether types are preferred. Most preferably, bisphenol A, brominated bisphenol A, hydrogenated bisphenol A are used as the epoxy resin. Further, Epotote® manufactured by Toto Kasei, K.K. and Epikote® manufactured by Yuka Shell Epoxy Co. may be used as the epoxy resin.

Preferred curing agents include polyaddition type, catalyst type and condensation type curing agents. The polyaddition type curing agents include, but are not limited to, polyamine-based dicyandiamide and the acid anhydride-based methyl nadic acid anhydride. The catalyst type curing agents include, but are not limited to, imidazole-based 2-methylimidazole, 2-ethyl 4-methylimidazole and 2-heptadecyl imidazole, Lewis acid-based monoethylamine boron trifluoride, piperazine boron trifluoride and other related compounds. Specifically, Amicure® (a product of Ajinomoto), amine-based curing agents, such as dicyandiamide, imidazole-based curing agents including Curazole® (a product of Shikoku Kasei) and Epicure® (a product of Yuka Shell), monoethylamine trifluoride complexes and other related compounds may be used. PN-23 (a product of Ajinomoto), an amine-based curing agent, and AH-62 (a product of Ajinomoto), an imidazole-based curing agent are particularly preferred.

The amount of curing agent used in the foam precursor materials will differ depending on the epoxy equivalents of the epoxy resin. Generally, an amount of curing agent is utilized that will effectively cure the epoxy resin. Preferable amounts are 1–25 parts by weight to 100 parts by weight of the epoxy resin and more preferably 1–10 parts by weight.

A foaming agent is selected that decomposes, and thus expands the epoxy resin, in a prescribed heating temperature range, depending on the curing agent used. The temperature range in which the curing agent can cure the epoxy resin should preferably overlap the temperature range in which the foaming agent decomposes and expands. The two temperature ranges are not required to completely overlap, because it is sufficient for the two temperature ranges to partially overlap. Specifically, the foaming (decomposition) temperature is preferably 100° C. or higher, and more preferably 120° C. or higher.

Preferably, organic decomposing-type foaming agents are utilized. For example, azodicarbonamide, azobisformamide, azobisisobutyronitrile, barium azodicarboxylate, N,N'-dinitrosopentamethylene tetramine, N,N'-dinitroso-N,N'-dimethylterephthalamide, para-toluenesulfonyl hydrazide, benzenesulfonyl hydrazide, 4,4'-oxybenzenesulfonyl hydrazide and other related compounds may be used. Any one or a combination of two or more of these foaming agents may be used. Azodicarbonamide is particularly preferred.

The foaming agent is preferably added in an amount to provide a foaming ratio of about 2–10 times, and more preferably about 2–6 times. That is, an amount of foaming agent is utilized that will produce a foamed product 35, 135 having a volume that is 2–10 times larger than the volume of the foamable member 30, 130, and more preferably about 2–6 times larger. While specific amounts will depend upon the particular epoxy resin that is selected, the foaming agent may be added at about 0.5–15 parts by weight to 100 parts by weight of the epoxy resin and more preferably 0.5–10 parts by weight.

In another preferred aspect of the present teachings, the foamable member 30, 130 may comprise one or more of a metal adhesive resin, a foaming agent, a foaming accelerator, a crosslinking agent, a monomer and a fibrous material. For example, the metal adhesive resin may be a polar resin that preferably adheres to a metal surface when it is heat treated for foaming. The metal adhesive resin may typically be a co-polymer of ethylene and an acrylic ester of a C1–C5 alcohol. Representative examples of such a resin include an ethylene-methyl acrylate copolymer resin (hereinafter referred to as EMA), an ethylene-ethyl acrylate copolymer resin (hereinafter referred to as EEA) and/or an ethylene-butyl acrylate copolymer (hereinafter referred to as EBA). Further, the metal adhesive resin may be a mixture of EMA, EEA or EBA and/or a low-density polyethylene (LDPE). Preferably, the mixture has an LDPE content less than 50%.

The foaming agent may be one or two members selected from the group consisting of azodicarbonamido (ADCA), dinitrosopentamethylenetetramine, oxy-bis(benzenesulfonyl hydorazide) and other similar compounds. The foaming accelerator may be zinc stearate, ZnO, MgO, stearic acid or another similar compound. Representative examples of the crosslinking agent include dicumyl peroxide (DCP), 1,3-bis (t-butylperoxyisopropyl) benzene and mixtures thereof. The monomer may be triallyl isocyanulate (TAIC), triallyl cyanulate (TAC), trimethylolpropane trimethacrylate (TMP) or similar compounds.

The fibrous material may be fiberglass, an organic fiber and/or other similar materials. The fibrous material may be, e.g., chopped strands having a length of 5 to 20 mm and the fibrous material may comprise about 10 to 100 parts by weight per 100 parts by weight of the metal adhesive resin. The foamable members 30, 130 may additionally contain supplemental fillers, such as for example calcium carbonate talc and/or clay.

As discussed above, the foamable members 30, 130 are preferably prepared at a low temperature that avoids or minimizes activation of the foaming agent. Known techniques and machines may be selectively used for the mixing process and the forming process. Further, the foamable members 30, 130 can be heated as described above.

The foamable members 30, 130 are preferably a blend of reactive ingredients that have not yet reacted with each other. When the foamable members 30, 130 are heated, the ingredients will react in order to form the foamed products 35, 135, preferably at an expansion ratio of about 2 to 5. Fibrous materials may be preferably utilized to increase the strength of the foamed products 35, 135 without decreasing the foamability of the foaming agent. In particular, foamed products 35, 135 that contain EMA, EEA or EBA exhibit strong adhesion to a metallic surface.

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

What is claimed is:

1. A reinforcement device adapted to reinforce a cavity of a hollow structural member comprising:

at least one elongated reinforcement body having a longitudinal axis and a plurality of holes defined along the longitudinal axis, and at least one foamable member that produces a foamed product when heated, the foamable material comprising a plurality of foamable projections, wherein the foamable member is disposed along the longitudinal axis of the reinforcement body so that the foamed product will extend along the longitudinal axis of the reinforcement body in order to bond the reinforcement body to the hollow structural member and the foamable projections are disposed within the holes defined within the at least one elongated reinforcement body.

2. A reinforcement device as defined in claim 1, wherein at least one retainer recess extends along substantially the entire longitudinal axis of the reinforcement body, the holes are defined along the retainer recess and the foamable member is received within the retainer recess such that the foamable projections are inserted into the respective holes.

3. A reinforcement device as defined in claim 1, wherein the foamable member comprises a metal adhesive resin, a foaming agent and a crosslinking agent.

4. A reinforcement device as defined in claim 3, wherein the foamable member further comprises a fibrous reinforcing material.

5. A reinforcement device as defined in claim 1, wherein the foamable member continuously extends along the entire longitudinal axis of the reinforcement member.

6. A reinforcement device as defined in claim 1, further comprising a plurality of clips attached to the reinforcement body, wherein the plurality of clips are adapted to engage a second plurality of holes defined in the hollow structural member.

7. A reinforcement device as defined in claim 1, wherein the foamable member comprises an epoxy resin having an epoxy equivalents value of 300–4000, a curing agent and a foaming agent.

8. A reinforcement device as defined in claim 7, wherein the foamable member further comprises a fibrous reinforcing material.

9. A reinforcement device as in claim 1, wherein the foamable projections extend substantially perpendicularly from a longitudinal axis of the foamable member.

10. In combination:
   a hollow structural member having a cavity defined therein and
   a reinforcement device adapted to reinforce the cavity of the hollow structural member after being heated, the reinforcement device comprising:
      at least one elongated reinforcement body having a longitudinal axis and a plurality of holes defined along the longitudinal axis, and
      at least one foamable member that produces a foamed product when heated, the foamable material comprising a plurality of foamable projections, wherein the foamable member is disposed along the longitudinal axis of the reinforcement body so that the foamed product will extend along the longitudinal axis of the reinforcement body in order to bond the reinforcement body to the hollow structural member and the foamable projections are disposed within the holes defined within the at least one elongated reinforcement body, wherein a clearance is defined between the inner surface of the hollow structural member and the reinforcement device.

11. A combination as defined in claim 10, wherein at least one retainer recess extends along substantially the entire longitudinal axis of the reinforcement body, the holes are defined along the retainer recess and the foamable member is received within the retainer recess such that the foamable projections are inserted into the respective holes.

12. A combination as defined in claim 10, wherein the foamable member continuously extends along the entire longitudinal axis of the reinforcement member.

13. A combination as defined in claim 10, further comprising a plurality of clips attached to the reinforcement body, wherein the plurality of clips engage a second plurality of holes defined in the hollow structural member.

14. A combination as in claim 10, wherein the foamable projections extend substantially perpendicularly from a longitudinal axis of the foamable member.

15. A combination as defined in claim 10, wherein the foamable member comprises an epoxy resin having an epoxy equivalents value of 300–4000, a curing agent and a foaming agent.

16. A combination as defined in claim 15, wherein the foamable member further comprises a fibrous reinforcing material.

17. A combination as defined in claim 10, wherein the foamable member comprises a metal adhesive resin, a foaming agent and a crosslinking agent.

18. A combination as defined in claim 17, wherein the foamable member further comprises a fibrous reinforcing material.

19. A method of reinforcing a hollow structural member, comprising:
   attaching a reinforcing device to a cavity defined within the hollow structural member, the reinforcing device comprising at least one elongated reinforcement body having a longitudinal axis, wherein a plurality of holes are defined along the longitudinal axis, and at least one foamable member having a plurality of foamable projections arranged and constructed to align with the respective plurality of holes, wherein the foamable member extends along the longitudinal axis of the reinforcement body, the foamable projections are inserted into the respective holes, and a clearance is defined between the inner surface of the hollow structural member and the reinforcing device and
   applying external heat to the hollow structural member and the reinforcing device in order to activate the foamable member having the foamable projections and thereby form a foamed product that extends along the longitudinal axis of the reinforcement body, whereby the foamed product bonds the reinforcement body to the hollow structural member and foamed projections securely engage the respective holes.

20. A method as defined in claim 19, wherein the reinforcement body further comprises a plurality of clips and a second plurality of holes are defined in the hollow structural member and the attaching step further comprises engaging the plurality of clips in the second plurality of holes defined in the hollow structural member.

21. A method as defined in claim 20, wherein the foamable member comprises an epoxy resin having an epoxy equivalents value of 300–4000, a curing agent, a foaming agent and a fibrous reinforcing material.

22. A method as defined in claim 19, wherein the foamable member comprises a metal adhesive resin, a foaming agent, a crosslinking agent and a fibrous reinforcing material.

23. A method as in claim 19, the foamable projections extend substantially perpendicularly from a longitudinal axis of the foamable member.

* * * * *